United States Patent [19]

Ng et al.

[11] Patent Number: 5,382,271
[45] Date of Patent: Jan. 17, 1995

[54] HYDROGEN GENERATOR

[75] Inventors: Moses L. Ng; Mu-Jen Young; Yaw-Chung Cheng, all of Hsinchu,

[73] Assignee: Industrial Technology Research Institute, Hsinchu,

[21] Appl. No.: 814,114

[22] Filed: Dec. 26, 1991

[51] Int. Cl.⁶ .................................. B01J 7/00
[52] U.S. Cl. .................................. 48/61; 48/127.9; 422/189; 422/191; 422/193; 422/200; 422/201; 422/205; 422/211; 423/650; 423/651; 423/655; 423/656
[58] Field of Search ............... 48/61, 94, 127.9; 422/49, 191, 200, 201, 211, 171, 177, 197, 205, 189, 193; 423/648.1, 655, 656, 650, 651

[56] References Cited

U.S. PATENT DOCUMENTS

| | | | |
|---|---|---|---|
| 3,472,631 | 10/1969 | Schober | 422/191 X |
| 3,506,408 | 4/1970 | Kageyama et al. | 422/191 |
| 3,556,738 | 1/1971 | Schober | 422/191 X |
| 3,807,963 | 4/1974 | Smith | 422/197 |
| 3,909,299 | 9/1975 | Corrigan | 48/94 X |
| 4,337,224 | 6/1982 | Mahler et al. | 422/197 |
| 4,666,680 | 5/1987 | Lewis | 422/191 |
| 4,714,592 | 12/1987 | Zanma et al. | 422/201 X |
| 4,865,624 | 9/1989 | Okada | 48/61 |
| 4,904,455 | 2/1990 | Karafian et al. | 422/197 X |
| 4,932,981 | 6/1990 | Ohsaki et al. | 48/94 |
| 5,232,682 | 8/1993 | DuPont | 423/648.1 |

*Primary Examiner*—James C. Housel
*Assistant Examiner*—Maureen M. Wallenhorst
*Attorney, Agent, or Firm*—W. Wayne Liauh

[57] ABSTRACT

A compact structure for a hydrogen generator is disclosed using a porous metal layer instead of conventional evaporators, thus reducing the size of the generator. This invention further includes a catalyst used in the water-shift reaction which reduces the toxic carbon monoxide in the product.

9 Claims, 6 Drawing Sheets

12A(12B)

11

HYDROGEN GENERATOR

BACKGROUND OF THE INVENTION

The present invention relates to a hydrogen generator, and especially to a compact structure for the hydrogen generator.

Hydrogen plays an important role in the chemical process industries. The amount of hydrogen used in oil hardening, petroleum reforming, and ammonia producing processes, etc. is considerable. Consequently, engineers are still working on cheaper and more efficient methods of producing hydrogen, which are the goals of this invention.

Except from water electrolysis, pure hydrogen cannot be produced in a single step. However, electrolyzing water is only economically feasible using very cheap electricity. A general method is to first produce 'syngas' which is a mixture consisting of hydrogen, carbon monoxide, and carbon dioxide in different ratios. Syngas can then be further purified to obtain pure hydrogen, or directly used in places where hydrogen is needed.

To generate syngas, various types of hydrogen generators can be used. The structure of a common type of hydrogen generator is shown in FIG. 1. This type of hydrogen generator uses methane as its feed. When methane and water vapor are introduced into a catalyst bed 2 through an inlet 3, a steam reforming reaction begins, thus converting the feed into hydrogen and carbon monoxide. Combustible gas is introduced through a lower entrance 4 into the combustion chamber 1. After combustion, exhaust gas flows through the interior of the hydrogen generator so as to provide the heat required for steam reforming reactions by exchanging heat with the feed, thus improving the thermal efficiency.

However, this type of hydrogen generator still suffers from the following problems: The whole catalyst bed 2 is always at a high temperature. Since the water-gas shift reaction represented by equation (1) is an exothermic reaction, the product of the reaction contains a high percentage of toxic carbon monoxide at high temperature.

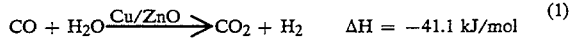
(1)

Consequently, the product cannot be used unless the carbon monoxide produced is converted into carbon dioxide by a water-gas shift reaction at a lower temperature in another reactor. As a result, the complexity of the hydrogen generator increases significantly.

In addition, since water cannot be directly used as a feed in this type of hydrogen generator due to its nature of destroying the catalyst bed, this type of hydrogen generator needs a source of steam. This creates additional problems in designing the entire system of the hydrogen generator.

FIG. 2 illustrates another type of hydrogen generator using methyl alcohol as feed. The mixture of methyl alcohol and water enters an evaporator 5, and evaporates therein. Then, the mixture in the gaseous state is guided into the tubular catalyst bed 6 and is converted into hydrogen and carbon monoxide through a methanol decomposition reaction shown by equation (2). Subsequently, carbon monoxide is further converted into carbon dioxide through the water-gas shift reaction mentioned before.

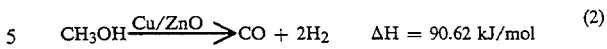
(2)

A combustion chamber 7 is built at the upper end of the hydrogen generator. Combustible gas enters and burns inside the combustion chamber 7, thus providing heat needed for the evaporating process and the steam reforming reaction. The evaporator 5 is positioned in the center of the generator so as to reduce heat losses.

From FIG. 2, it can be seen that the evaporator 5 takes up a considerable space in the generator. In comparison, a catalyst can only be placed in a limited volume within a tube having an annular section. Accordingly, the overall volumetric efficiency is poor.

OBJECTS AND SUMMARY OF THE INVENTION

It is the object of this invention to provide a hydrogen generator having a compact structure, comprising:
a shell body;
a plurality of partition plates for dividing the space inside the shell body into sections, having notches for providing a winding flow path through each of the sections;
a combustion chamber located near one end of the shell body;
an exhaust gas chamber located near the other end of the shell body;
a plurality of tubes passing through the sections that connect the combustion chamber and the exhaust gas chamber; and
at least one of the sections near the combustion chamber in which porous metal has been placed for evaporating and heating the feed;
whereby the sections without the porous metal inside are filled with a catalyst used in methanol decomposition,
when the feed is guided into the shell body and flows through each section, the feed is converted into hydrogen and wastes with the aid of the catalyst used in methanol decomposition, and combustible gas is guided into and burns in the combustion chamber, and flows into the exhaust gas chamber by way of the tubes to supply the heat of reaction needed in the converting process.

In the second embodiment of this invention, at least one of the sections near the exhaust gas chamber is filled with a catalyst used in the water-gas shift reaction, and the other sections without porous metal inside are filled with a catalyst used in the steam reforming reaction.

BRIEF DESCRIPTION OF THE DRAWINGS

This invention will be explained in more detail on the basis of exemplary embodiments with reference to the drawings, in which.

DETAILED DESCRIPTION OF THE PREFERRED EMBODIES

Figure 1:
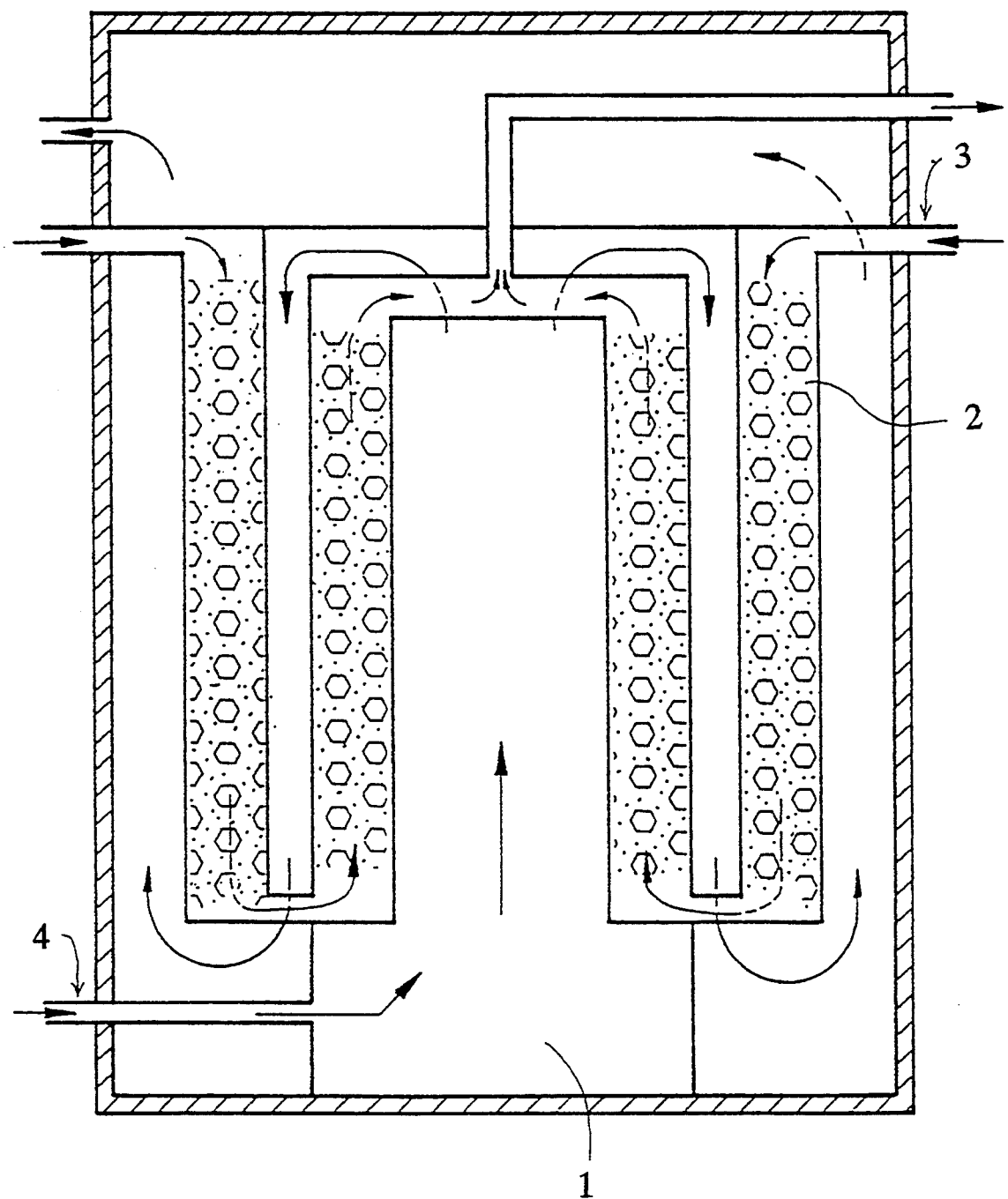
FIG. 1 is a schematic drawing showing the type of conventional hydrogen generator using methane as its feed.
Figure 2:
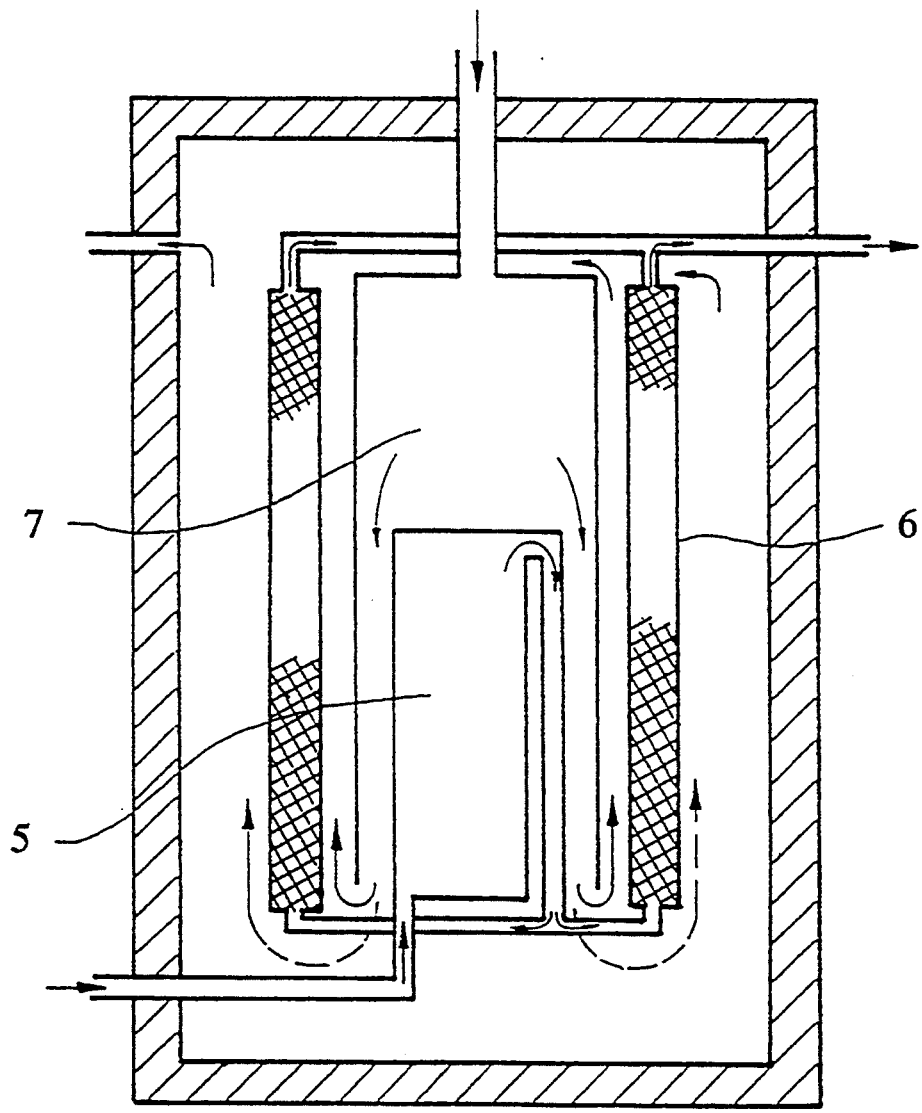
FIG. 2 is a schematic drawing showing another type of conventional hydrogen generator using methyl alcohol as its feed.
Figure 3:
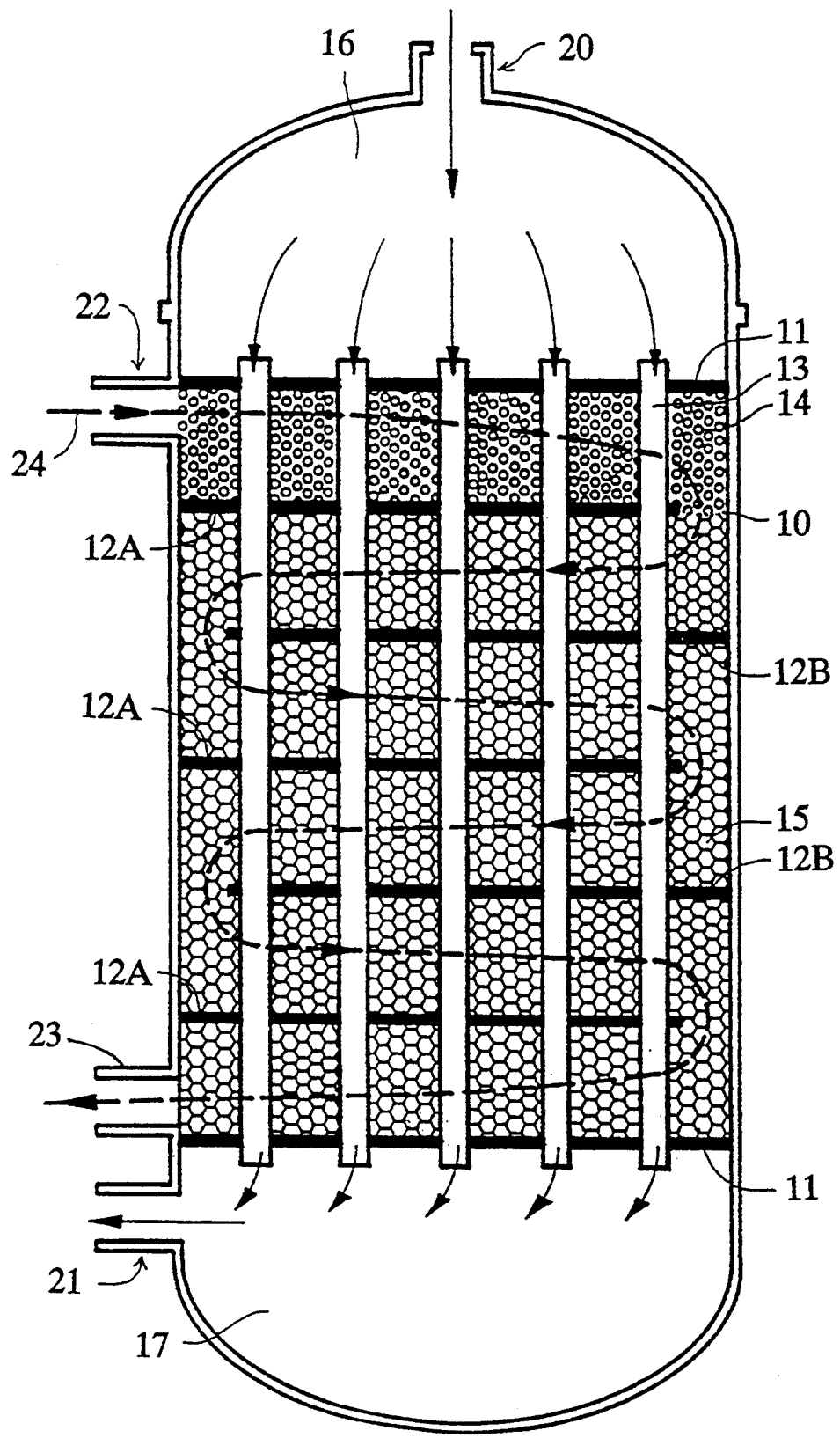
FIG. 3 is a schematic drawing showing the hydrogen generator in accordance with a first embodiment of the present invention, using methyl alcohol as its feed.

As shown in FIG. 3, a first embodiment of this invention comprises a shell body 10, two end plates 11, a first set and a second set of partition plates 12A and 12B, a plurality of heating tubes 13, a porous metal layer 14, and catalyst 15.

Figure 4:
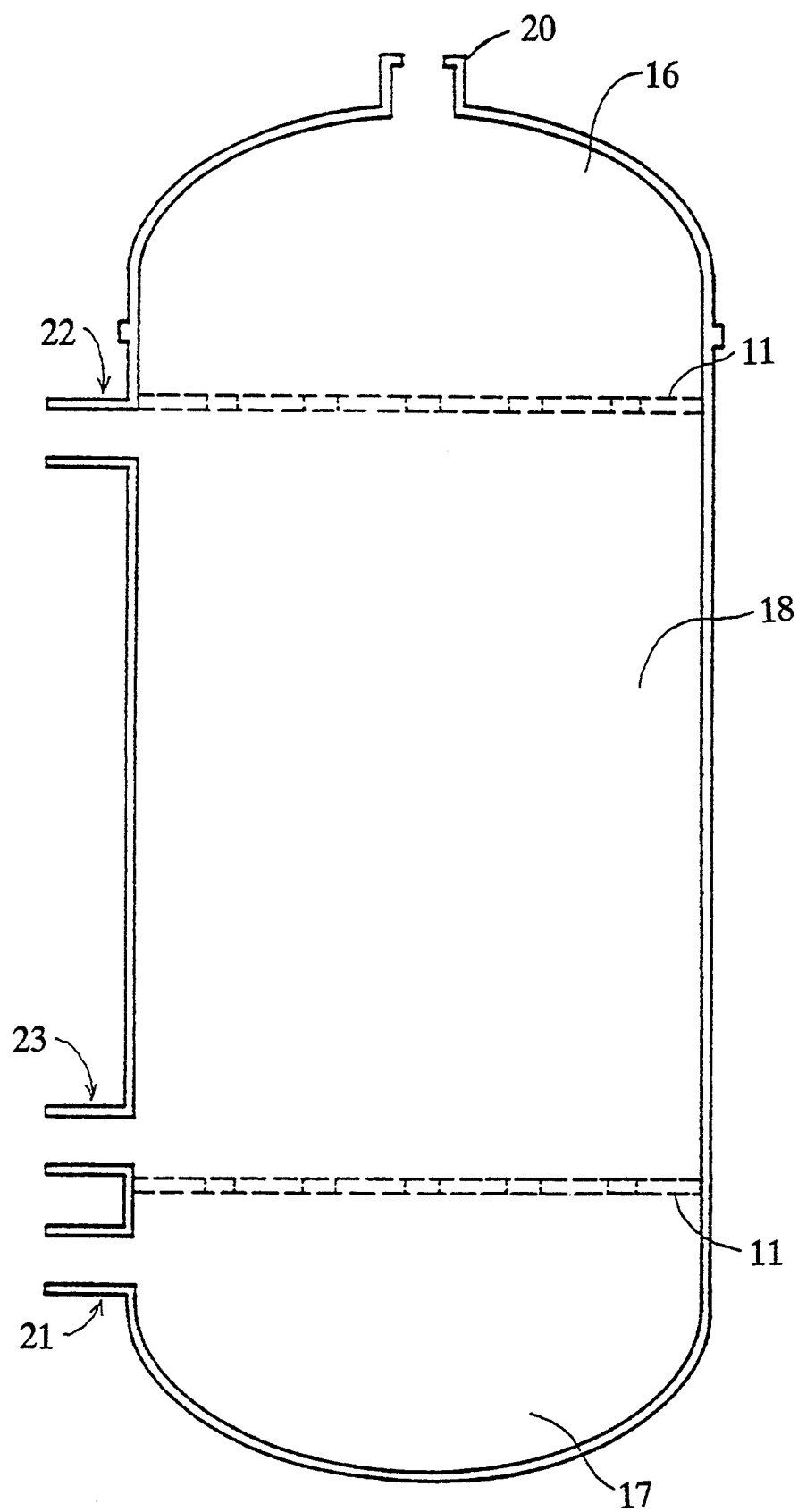
FIG. 4 is a sectional view showing the structure of a shell body and two end plates included in the hydrogen generator of FIG. 3.
Figure 5:
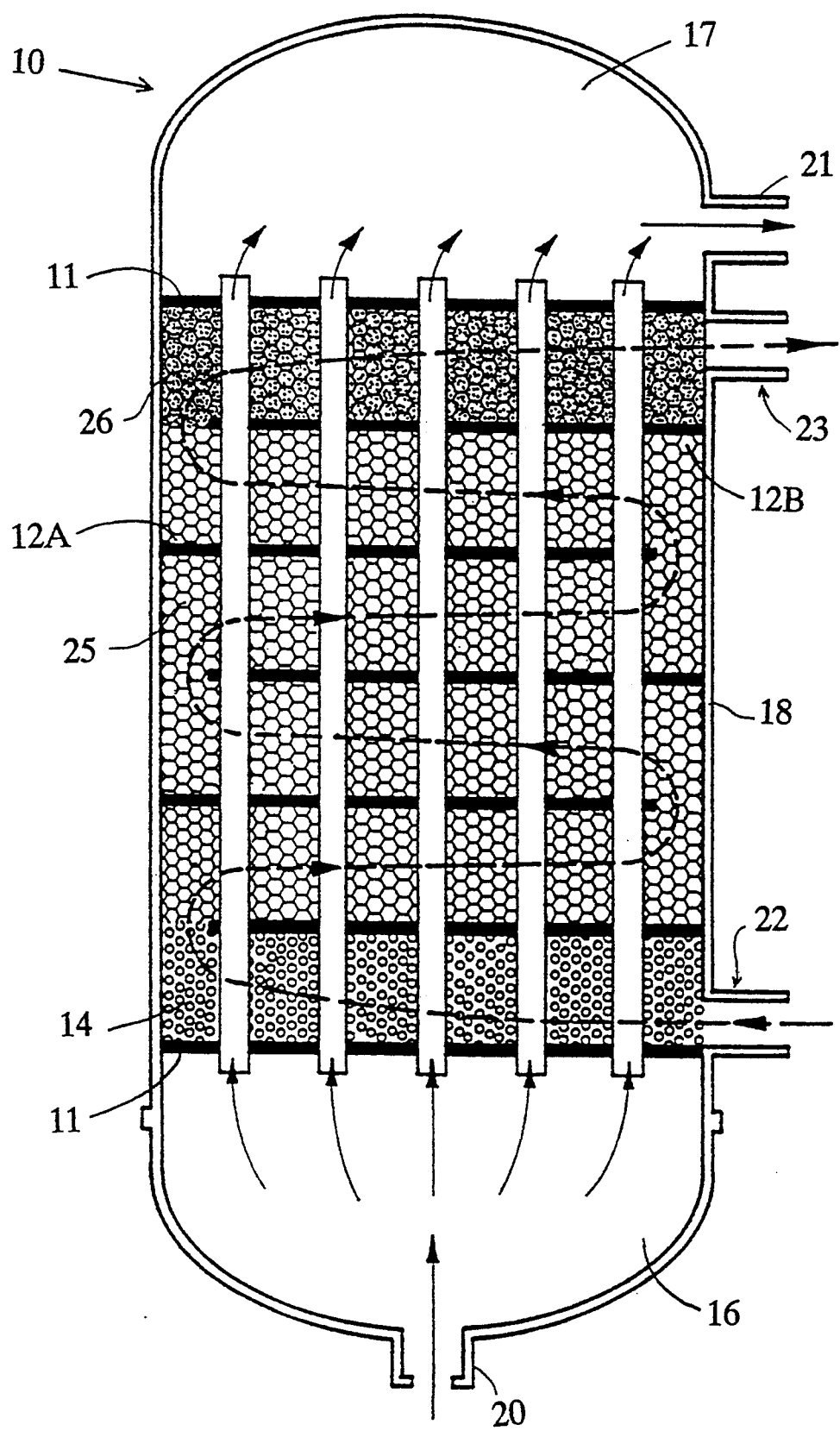
FIG. 5 is a schematic drawing showing the hydrogen generator in accordance with a second embodiment of the present invention, using gasoline, alcohol or other extractions of petroleum as its feed.
Figure 7:
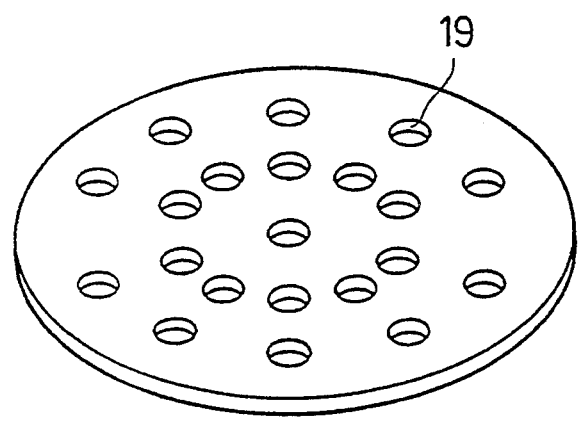
FIG. 7 is a perspective view of the end plate utilized in this invention.

Referring now to FIGS. 4 and 5, the shell body 10 is substantially a hollow cylindrical metal shell. As shown by the phantom line in FIG. 4, two end plates 11 (see also FIG. 7) are disposed near the two longitudinal ends of the shell body 10, thus dividing the space within the shell body 10 into a combustion chamber 16, an exhaust gas chamber 17, and a cylindrical intermediate portion 18 between the two chambers 16 and 17. The shell body 10 includes a combustible gas inlet 20 through which combustible gas is introduced into combustion chamber 16, an exhaust gas outlet 21 through which the exhaust gas of the hydrogen generator is discharged, a feed inlet 22 to connected to cylindrical portion 18 just below the end plate 11 which separates cylindrical space 18 and combustion chamber 16 and a hydrogen/waste outlet 23 for conducting the cylindrical space near the exhaust gas chamber 17. The feed inlet 22 and the hydrogen/waste outlet 23 are on the side of the shell body 10. Partition plates 12A and 12B divide the intermediate portion 18 into several sections.

Figure 6:
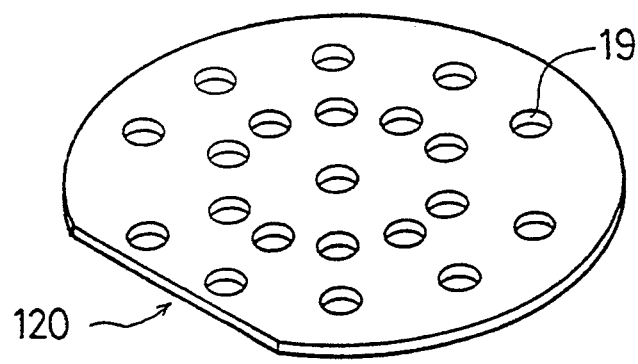
FIG. 6 is a perspective view of the partition plate utilized in this invention.

As shown in FIG. 6, each of the partition plates 12A (12B) is a substantially circular metal plate having a notch 120 on its rim. The first set of partition plates 12A and the second set of partition plates 12B are alternately arranged in the axial direction of the shell body 10 within the intermediate portion 18, with each of the partition plates 12A of the first set except the outermost (uppermost or lowermost) ones being sandwiched by and properly spaced from two adjacent partition plates 12B of the second set, thus dividing the intermediate portion 18 into a plurality of consecutive sections, including a first section which is adjacent to the combustion chamber 16 and communicates with the feed inlet 22, the last section of which is adjacent to the exhaust gas chamber 17 and communicates with the hydrogen/waste outlet 23, and several intermediate sections between the first and the last sections. Since the notches 120 of the first set of partition plates 12A and those of the second set of partition plates 12B are located in diametrically opposite positions, a labyrinthic flow path 24 of feeds, extending from the feed inlet 22 through the first section, the intermediate sections and the last section to the hydrogen/waste outlet 23, is thus formed within the intermediate portion 18.

The end plates 11 and the partition plates 12 have holes 19 thereon. A plurality of heating tubes 13 cross each of the end plates 11 and the partition plates 12 through the holes 19. The heating tubes 13 connect the combustion chamber 16 and the exhaust gas chamber 17.

The first section of the shell body 10 is filled with porous metal so as to form a porous metal layer 14 which is porous like a sponge. Due to its porosity, the porous metal layer 14 has a larger surface area per unit volume than other materials. The porous metal layer may be obtained through powder metallurgy.

The remaining sections of the shell body 10 are filled with catalysts 15. Different types of catalyst may be used for different reactions. If the feed is methane, the catalyst used in the methanol decomposition reaction is placed into the middle sections and the last section. If the feed is other hydrocarbons, the catalyst used in the steam reforming is placed into the middle sections and catalyst used in the water-gas shift reaction is placed into the last section. In this embodiment, to catalyst used in the methanol decomposition has been selected.

The reaction that takes place in this embodiment is a methanol decomposition reaction

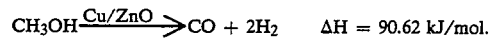

$$CH_3OH \xrightarrow{Cu/ZnO} CO + 2H_2 \quad \Delta H = 90.62 \text{ kJ/mol}.$$

After the above reaction, the water-gas shift reaction occurs

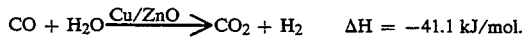

$$CO + H_2O \xrightarrow{Cu/ZnO} CO_2 + H_2 \quad \Delta H = -41.1 \text{ kJ/mol}.$$

From the above chemical balance of the water-gas shift reaction, we know that the production of CO and $H_2O$ increases when this chemical system is at a high temperature, while the amount of $CO_2$ and $H_2$ increases when this chemical system is at low temperature.

In the operation of this embodiment, combustible gas is guided into the combustion chamber 16 through the combustible gas inlet 20, and burns in the combustion chamber 16. After combustion, the exhaust gas at a very high temperature is emitted into the heating tubes 13, passes each section, enters the exhaust gas chamber 17, and finally leaves the shell body 10 through the exhaust gas outlet 21. The heat of the exhaust gas is transferred to the porous metal layer 14 and catalyst 15 while the exhaust gas passes through the heating tubes. The temperature of the exhaust gas decreases at the same time. So the temperature inside the shell body 10 gradually decreases from the first section to the last section.

The feed of this embodiment is a mixture of methane and water. When the feed enters the shell body 10 through the feed inlet 22, it is evaporated because the porous metal layer is at a very high temperature. The methane and water in the gas state then enters the sections filled with catalyst 15. At this time the methanol decomposition reaction occurs by the aid of the catalyst 15. Methane is converted into carbon monoxide and hydrogen. The heat required for the reaction is supplied from the exhaust gas. When the feed reaches those sections near the exhaust gas chamber 17, its temperature gradually decreases. Consequently, from the above discussed water-gas shift reaction, it is evident that most of the carbon monoxide in the product will react with water to form carbon dioxide and hydrogen. So the quantity of carbon monoxide in the product is reduced to a negligible amount. Finally, the product containing hydrogen and carbon dioxide leaves the shell body 10 through the hydrogen/waste outlet 23.

There is a second embodiment shown in FIG. 5. Liquid state hydrocarbon is used as a feed in this embodiment. The difference between the first embodiment and the second embodiment is that the hydrogen generator in the second embodiment is inverted. The catalyst used in the second embodiment is also different. The intermediate sections are filled with catalyst 25 for the steam reforming reaction. The last section is filled with catalyst 26 for the water-gas shift reaction. The feed enters the shell body 10 through the feed inlet 20 at a lower position. The hydrocarbon is converted into hydrogen in the steam reforming reaction $$CnHm + nH_2O \xrightarrow{Ni/Al_2O_3} nCO + \left(n + \frac{m}{2}\right)H_2 \quad \Delta H > 0.$$

The carbon monoxide in the product is further converted into hydrogen and carbon dioxide in the water-gas shift reaction in the last section at a lower temperature $$CO + H_2O \xrightarrow{Cu/ZnO} CO_2 + H_2 \quad \Delta H = -41.1 \text{ kJ/mol}.$$

Feeds having densities greater than methanol can be processed in this type of hydrogen generator.

What is claimed is:

1. A hydrogen generator for converting a liquid-containing feed into hydrogen and wastes by methanol decomposition with the aid of a catalyst via heat exchange with a bunting combustible gas, comprising:

a closed shell body having an outer circumference, a feed inlet, a hydrogen and waste outlet, a combustible gas inlet, and an exhaust gas outlet;

two end plates enclosed in said shell body, orthogonal to the longitudinal direction of said shell body for dividing the space inside said shell body into a combustion chamber at one end, an exhaust gas chamber at the other end, and a cylindrical space between said two chambers;

a plurality of partition plates enclosed in said shell body, orthogonal to the longitudinal direction of said shell body for dividing said cylindrical space into a first section adjacent to said combustion chamber, a last section adjacent to said exhaust gas chamber, and a set of middle sections;

each of said partition plates having a notch on a rim thereof opposing the notches of neighboring ones of said partition plates thereby providing a flow path through each of said sections;

a plurality of tubes passing through each of said sections and said partition plates and said end plates for connecting said combustion chamber with said exhaust gas chamber;

a porous metal layer in said first section for heating said feed and causing vaporization of said feed to a gaseous state;

said combustible gas inlet being in communication with said combustion chamber for injecting a combustible gas into said combustion chamber;

said exhaust gas outlet being in communication with said exhaust gas chamber for exiting an exhaust gas produced as a result of burning said combustible gas in said combustion chamber;

said plurality of tubes being adapted to transfer heat produced by said combustible gas to said sections;

said feed inlet being connected to said outer circumference of said shell body, and being in communication with said first section opposing the notch of the partition plate neighboring said first section;

said hydrogen and waste outlet being connected to said outer circumference of said shell body and in communication with said last section opposing the notch of the partition plate neighboring said last section;

said sections without said porous metal layer inside being filled with a catalyst for aiding methanol decomposition;

whereby said combustible gas enters through said combustible gas inlet into said combustion chamber and burns therein to produce heat, then flows into said exhaust gas chamber by way of said tubes, and leaves through said exhaust gas outlet to supply heat of reaction needed in the decomposition process as well as heat of vaporization required in said porous metal layer.

2. A hydrogen generator for converting a liquid-containing feed into hydrogen and wastes by a steam reforming reaction and a water gas shift reaction with the aid of at least one catalyst via heat exchange with a burning combustible gas, comprising:

a closed shell body having a circumference, an internal space inside said shell body, a feed inlet, a hydrogen and waste outlet, a combustible gas inlet, and an exhaust gas outlet;

two end plates enclosed in said shell body orthogonal to the longitudinal direction of said shell body for dividing said internal space into a combustion chamber at one end, an exhaust gas chamber at the other end, and a cylindrical space between said two chambers;

a plurality of partition plates provided in said shell body orthogonal to the longitudinal direction thereof for dividing said cylindrical space into a first section neighboring said combustion chamber, a last section neighboring said exhaust gas chamber, and a plurality of middle sections, wherein each of said plates has a notch on a rim of said plate opposing the notches of neighboring partition plates so as to define a flow path through each of said sections;

a porous metal layer in said first section for evaporating said feed into a gaseous state;

at least one of said sections other than said first section being filled with at least one catalyst used in a steam reforming reaction and at least one catalyst used in a water gas shift reaction.

a plurality of tubes passing through each of said sections and said partition plates and said end plates for connecting said combustion chamber with said exhaust gas chamber; whereby when said feed enters through said feed inlet into said shell body and flows through each section along said flow path, said liquid-containing is first evaporated into a gas phase in said porous metal layer and then converted into hydrogen and carbon monoxide with the aid of said at least one catalyst used in a steam reforming reaction;

said carbon monoxide is then reacted with water to produce carbon dioxide and hydrogen with the aid of said at least one catalyst used in a water gas shift reaction; and said hydrogen and said wastes including said carbon dioxide exit said shell body through said hydrogen and waste outlet.

3. A hydrogen generator as claimed in claim 2, wherein said at least one catalyst used in a water gas shift reaction is placed in said last section.

4. A hydrogen generator for making hydrogen and wastes from a liquid-containing feed of fluid and hydrocarbons with the aid of heat supplied by burning a combustible fluid, comprising:

a hollow body;

separating means for separating said body into first, second and third chambers spaced sequentially in said hollow body;

communicating means for communicating said first chamber with said third chamber:

said communicating means including heat exchange means for exchanging heat with said second chamber;

a first inlet connected to said first chamber for introducing said combustible fluid;

a second inlet connected to said second chamber for introducing said feed;

a first outlet connected to said third chamber for discharging said combustible fluid following combustion thereof;

a second outlet connected to said second chamber for discharging said hydrogen and wastes;

evaporating means in said second chamber for evaporating said liquid-containing feed into a gaseous state in said second chamber in the presence of said heat;

said evaporating means comprising at least one layer of a porous metal in said second chamber, and converting means in said second chamber for converting said gaseous feed into said hydrogen and wastes in the presence of said heat.

5. The hydrogen generator according to claim 4 which further comprises means for segmenting said second chamber into a plurality of layers to effectively create a flow path for said feed between said second inlet and second outlet.

6. The hydrogen generator according to claim 4, wherein said converting means includes at least one catalyst.

7. A hydrogen generator for extracting hydrogen from a liquid-containing feed of fluid and hydrocarbons with the aid of at least one catalyst and heat supplied by burning a combustible gas, comprising:

a hollow shell;

first and second partition plates for separating said hollow shell into a combustion chamber, a reaction chamber, and an exhaust chamber spaced sequentially in said hollow shell;

communicating means for communicating said combustion chamber with said exhaust chamber;

said communicating means including means for exchanging heat with said reaction chamber;

a plurality of plates in said reaction chamber effective to separate said reaction chamber into a plurality of layers;

a porous metal layer in at least one of said plurality of layers being effective to store said heat and evaporate said liquid-containing feed into a gaseous state;

at least one catalyst in said plurality of layers to react with said gaseous feed;

a feed inlet being connected to said reaction chamber at said porous metal layer;

a feed outlet being connected to said reaction chamber at a location downstream of said at least one catalyst;

said plurality of plates being effective to establish a flow path between said feed inlet and said feed outlet; a gas inlet connected to said combustion chamber for introducing combustible gas; and a gas outlet connected to said exhaust chamber for removing said combustible gas.

8. A hydrogen generator according to claim 7, wherein said porous metal layer is adjacent to said first partition plate.

9. A hydrogen generator according to claim 7, wherein said porous metal layer contains a porous metal prepared using a powder metallurgy process.

* * * * *